United States Patent [19]
Moffatt et al.

[11] Patent Number: 4,641,918
[45] Date of Patent: Feb. 10, 1987

[54] PORTABLE PANORAMIC THEATRE

[75] Inventors: Michael Moffatt; James LePage; Gerald Englar, all of Toronto, Canada

[73] Assignee: EML Environmental Simulations Inc., Toronto, Canada

[21] Appl. No.: 814,980

[22] Filed: Dec. 31, 1985

[30] Foreign Application Priority Data

Dec. 27, 1984 [CA] Canada .................... 471082

[51] Int. Cl.$^4$ ............................................. G03B 21/56
[52] U.S. Cl. ......................................... 350/125; 352/69
[58] Field of Search .................... 350/117, 123, 125; 352/69, 70; 353/48, 79; 434/286; 160/351

[56] References Cited

U.S. PATENT DOCUMENTS 2,900,870 8/1959 Jackson ............................. 350/125
2,942,517 6/1960 Moon, 3rd. et al. ............... 350/125

FOREIGN PATENT DOCUMENTS 1448913 7/1966 France .
1047728 11/1966 United Kingdom .

Primary Examiner—Richard A. Wintercorn
Attorney, Agent, or Firm—Mirek A. Waraksa

[57] ABSTRACT

A free-standing collapsible panoramic theatre is described. When assembled, the theatre includes a multiplicity of vertical screens arranged in a polygonal arrangement that defines an internal viewing region. The viewing screens are supported by a multiplicity of towers which are located external to the polygonal arrangement with one tower located at each vertical corner of the polygonal arrangement. Each tower has a base, a support structure extending vertically from the base, a manually-operable alignment mechanism which permits the vertical orientation of the support structure to be adjusted, a pair of upper and lower screen support brackets mounted for telescopic movement on the support structure and releasably retaining the pair of adjacent viewing screens at the vertical corner associated with the tower, and a projector support housing for supporting a projector. Projection passages are defined at each corner of the polygonal arrangement to permit projection of light from the tower associated with the corner through the internal viewing region onto an oppositely disposed viewing screen. The theatre is manufactured essentially as a kit of components which can be assembled and disassembled repeatedly for use at different locations.

30 Claims, 11 Drawing Figures 4,641,918

PORTABLE PANORAMIC THEATRE

FIELD OF THE INVENTION

The invention relates generally to theatre construction, and more specifically to the construction of a collapsible panoramic theatre.

DESCRIPTION OF THE PRIOR ART

Panoramic theatres are well known. In past years they have become popular at public fairs and exhibitions where people have been impressed by the impact of 360 degree viewing. Unfortunately, such theatres have generally been permanent structures and very expensive to construct. Accordingly, there appears to have been little progress towards incorporating panoramic viewing as part of the audio-visual presentation of products and services, even though the impact of such a presentation on prospective customers would be readily apparent to persons with marketing skills.

Accordingly, it is one object of the invention to provide a collapsible panoramic theatre which lends itself to product promotion at trade fairs and the like and which can be readily assembled and disassembled for use at different locations.

BRIEF SUMMARY OF THE INVENTION

The invention provides a collapsible panoramic theatre. The theatre includes a multiplicity of viewing screens which are arranged in a "polygonal arrangement" (basically appearing to be a polygonal structure when viewed from above) to define an internal viewing region. A multiplicity of towers external to the polygonal arrangement releasably support the viewing screens in their polygonal arrangement.

Each of the towers includes a free-standing base, a support structure extending upwardly from the base, screen support means for releasably supporting at least one of the viewing screens, and connector receipt means for releasably receiving connection means, consisting of a multiplicity of rigid connectors of preselected uniform size, which serve to join the towers to one another, essentially to define a unitary tower structure which resists toppling by horizontal forces. The connector receipt means include means co-operating with the connection means to constrain the tower, one adjacent tower and the other adjacent tower to locate in a predetermined orientation whenever the tower, an adjacent tower and the other adjacent tower are connected by the connection means and the connector receipt means of the respective towers. Basically, the theatre can be assembled from a kit of parts consisting of viewing screens, towers and connectors (together with appropriate fasteners), and the co-operation between the connector receipt means of the various towers and the connectors ensures that as the towers are joined they position themselves to eventually form a theatre framework of predetermined size and shape. The invention also provides a collapsible panoramic theatre which permits inter alia novel and convenient positioning of projectors. The theatre includes a multiplicity of viewing screens which are arranged in a polygonal arrangement to define an internal viewing region. Each pair of adjacent viewing screens in the polygonal arrangement defines a generally vertical corner, and each vertical corner is oppositely disposed across the internal viewing region to one of the viewing screens. The viewing screens are supported by a multiplicity of towers which are located external to the polygonal arrangement and to the internal viewing region. One tower is located at and associated with each of the corners of the polygonal arrangement.

Each tower includes a base, an elongate support structure which extends upwardly from the base, screen support means for releasably supporting the pair of adjacent viewing screens at the vertical corner associated with the tower, and projector support means for supporting a projector. A projection passage is defined at each corner of the polygonal arrangement to permit projection of light from the tower associated with the corner, through the internal viewing region, onto the associated oppositely disposed viewing screen. The viewing screen-tower construction permits the theatre to be readily assembled and disassembled.

Other inventive aspects of the present invention will be described with reference to a preferred embodiment below.

DESCRIPTION OF THE DRAWINGS

The invention will be better understood with reference to drawings illustrating a preferred embodiment, in which.

DESCRIPTION OF PREFERRED EMBODIMENT

Figure 1:
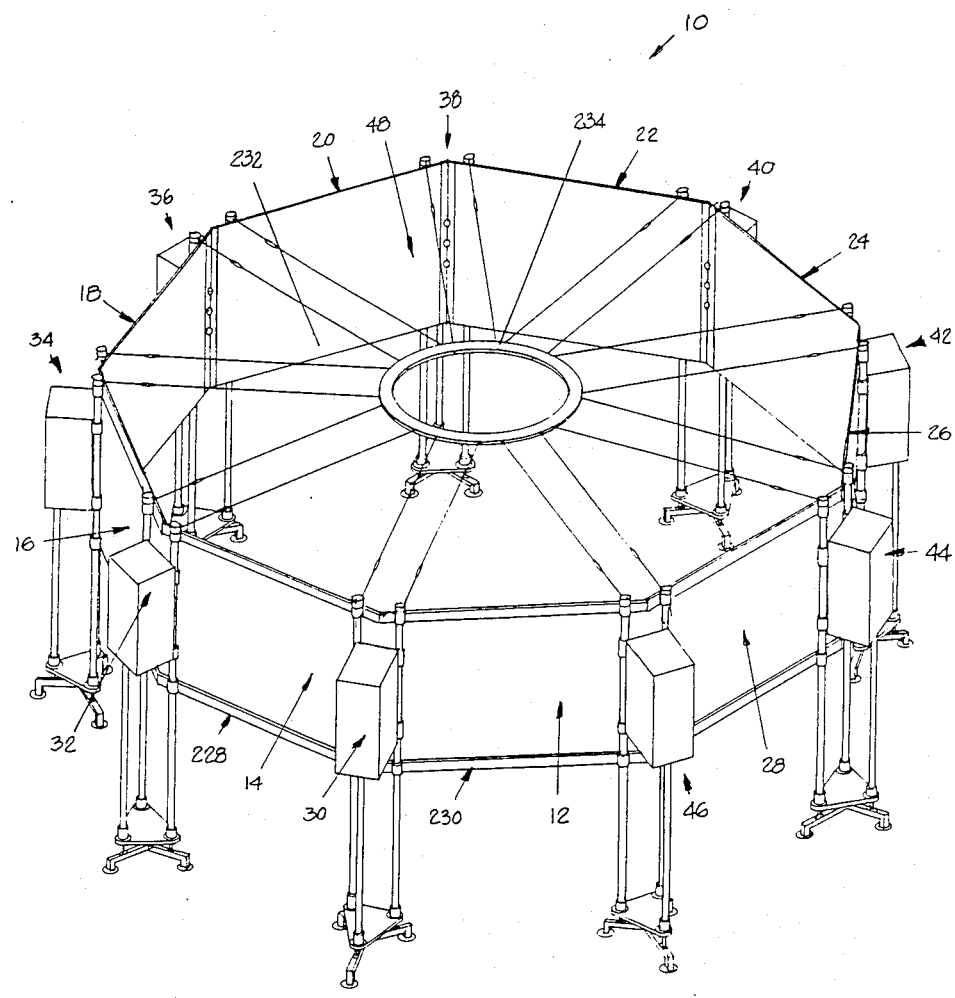
FIG. 1 is a perspective view of a collapsible panoramic theatre.
Figure 2:
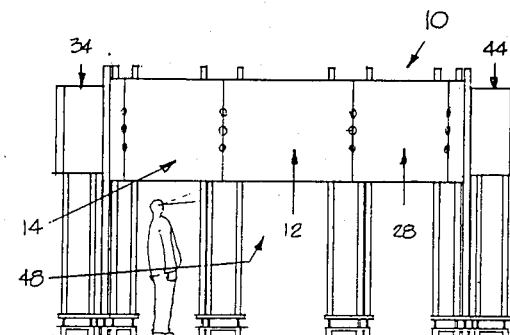
FIG. 2 is a side elevation view of the theatre with a number of projector housings removed to better illustrate the relationship between viewing screens and the provision of projection passages.
Figure 3:
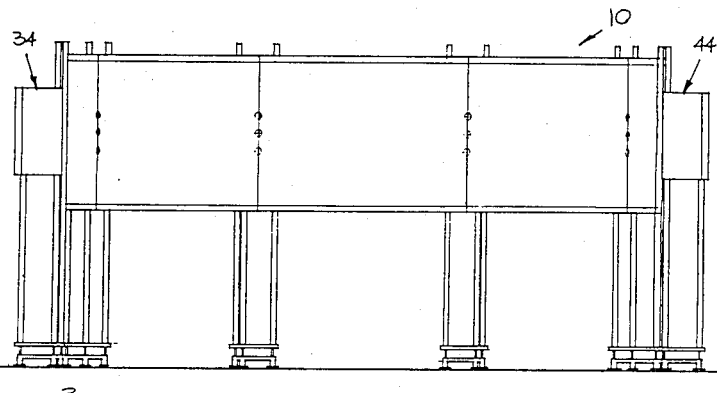
FIGS. 3 and 4 are side elevational views similar to that of FIG. 2 showing the theatre expanded by substitution of larger viewing screen.

FIG. 1 and 2 illustrate a collapsible and expandable panoramic theatre 10. The principal components of the theatre 10 are nine generally vertically oriented viewing screens 12–28 (even numbers only), and nine towers 30–46 (even numbers only) which support the viewing screens 12–28. The viewing screens are arranged in a nine-sided polygonal arrangement, and define an internal viewing region 48. Adjacent pairs of the viewing screens, due to the polygonal arrangement, define nine vertical corners 50-66 (even numbers only), in this embodiment angled at or according to a common corner angle (as apparent in FIG. 8). The towers are positioned external to the polygonal arrangement of viewing screens and the internal viewing region 48, with one of the towers located at and associated with each one of the vertical corners. Each tower in this embodiment serves to support primarily the pair of adjacent viewing screens at the vertical corner associated with the tower.

Figure 5:
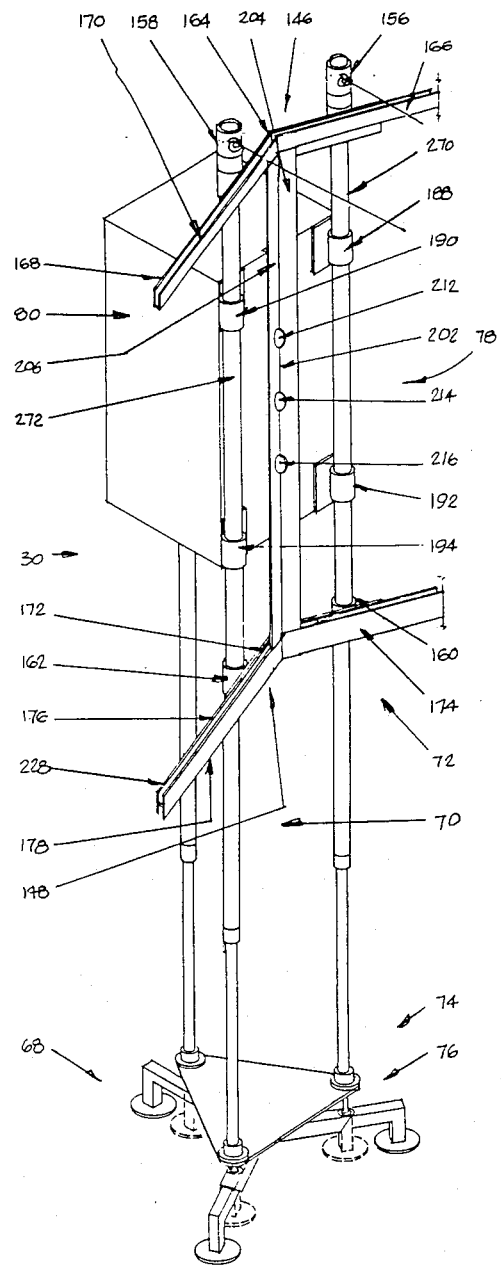
FIG. 5 is a perspective view of a typical tower involved in the assembly of the theatre.
Figure 6:
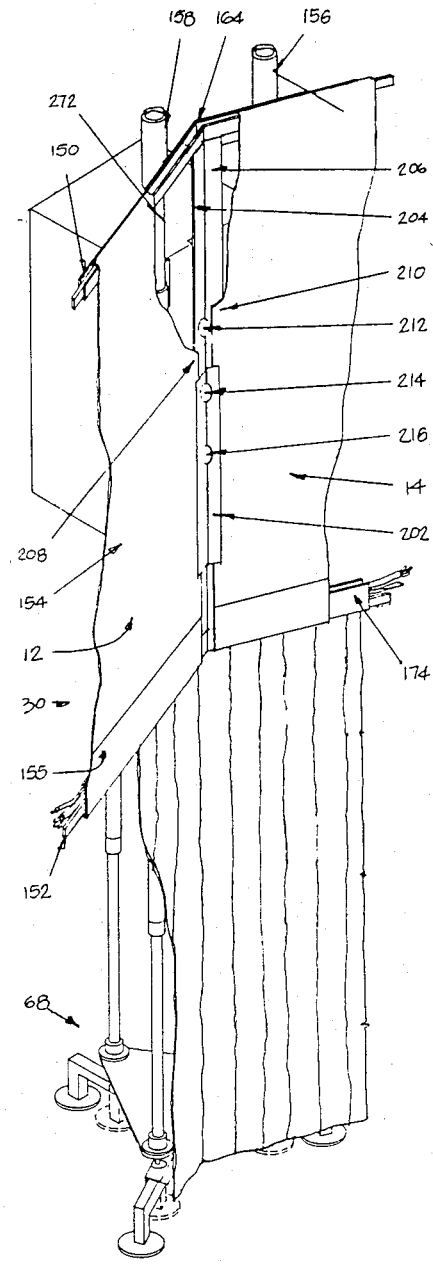
FIG. 6 is a second perspective view of the tower detailing the support provided by the tower for a pair of viewing screens, the suspension of a black-out curtain and the running of electrical wiring.

The tower 30 is typical, and is illustrated in greater detail in the views of FIGS. 5 and 6. In general terms, the tower 30 has a free-standing base 68, a support structure 70 extending upwardly from the base 68 and having a lower support structure section 72 attached to the base and an upper support structure section 74, a manually-operable alignment mechanism 76 which permits adjustment of the vertical orientation of the support structure 70, a sliding screen support mechanism 78 and a projector housing 80. Each of these components will be described in greater detail below.

Figure 9:
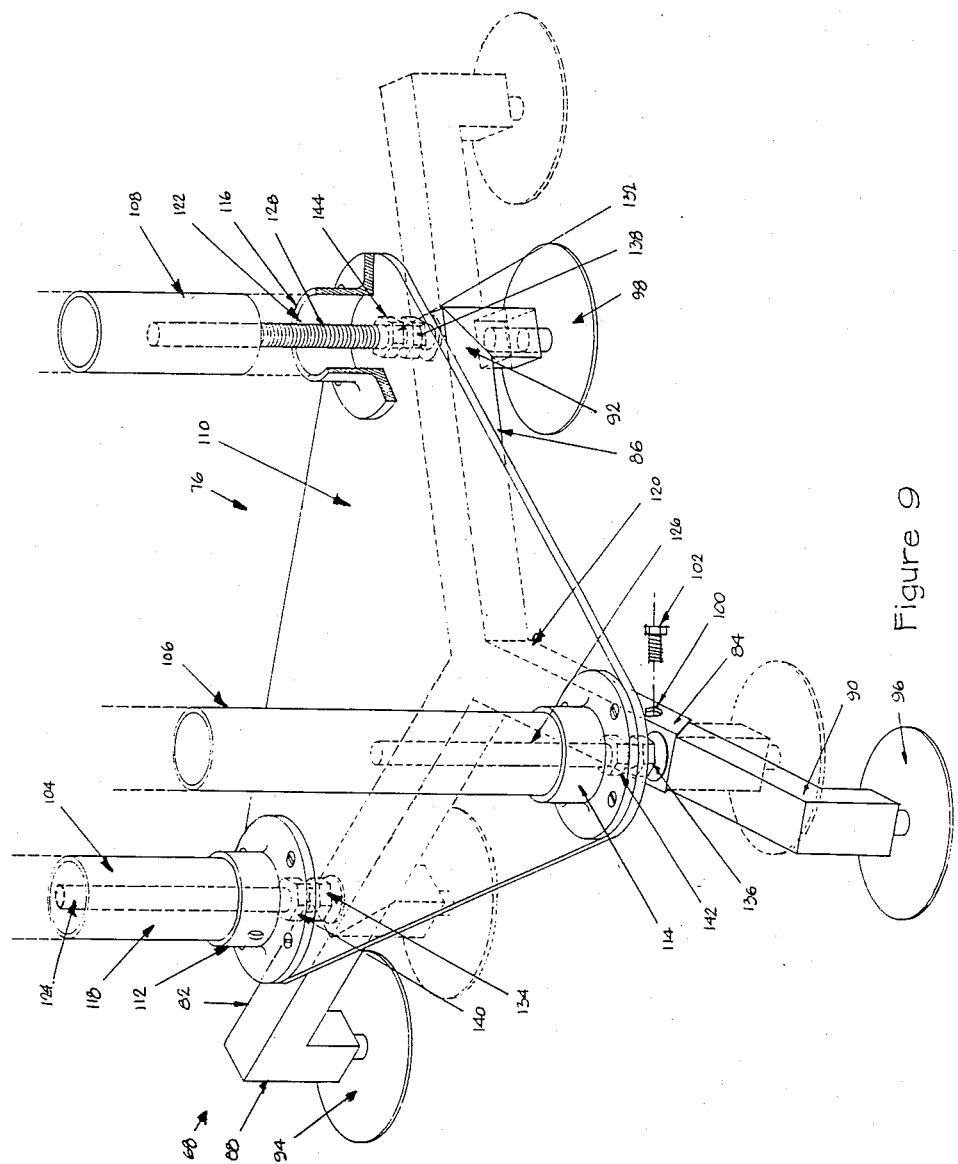
FIG. 9 is a perspective view illustrating a base and alignment mechanism associated with the tower.

The base 68 has three telescoping arms 82,84,86 which extend radially relative to a vertical axis through the support structure 70. Each of the telscoping arms is constructed of square tubular steel, and has an arm extension interfitted for telescopic movement with a stationary outer arm portion. Three steel legs 88,90,92 extend downwardly from the arm extensions, and terminate in three six-inch pads 94,96,98, respectively, which normally rest on whatever surface supports the theatre 10. The telescoping arms include lock mechanisms each consisting of a threaded aperture in the respective stationary arm portion and an Allen key screw fitted into the threaded aperture and acting essentially as a set screw (only one such threaded aperture 100 and Allan key 102 illustrated and indicated). The Allen keys can be rotated to releasably lock the the telescoping arms against telescopic movement. Such lock mechanisms have been used throughout the construction of the theatre 10, are well known, and have not been illustrated elsewhere to avoid excessive detail and to better highlight inventive aspects of the theatre 10. Two very important features regarding the base 68 should be noted: first, with three legs, the base 68 can rest properly on any generally horizontal surface, even allowing for minor irregularities in the surface; and second, the base 68 can be expanded to provide stable support for the tower 30 should the viewing screens 12-28 be replaced with larger viewing screens to expand the size of the theatre 10, as in FIG. 9.

The support structure 70 includes three steel cylindrical uprights 104,106,108. The uprights are telescoping members, consisting of upper and lower tubular members interfitted for telescopic movement. The uprights have locking mechanisms that permit the uprights to be releasably locked against telescopic movement, each locking mechanism consisting of a threaded aperture in the respective upper tubular member and an associated screw which bears against the respective lower (inner) tubular member, the threaded aperture being countersunk to permit the screw to seat flush or below the outer surface of the respective upper (outer) tubular member.

The alignment mechanism 76 serves to attach the cylindrical uprights 104, 106, 108 to the base 68 and to adjust their vertical orientation and also their elevation or height. These matters will be more apparent with reference to FIG. 9 where the alignment mechanism 76 is better illustrated. The mechanism includes a horizontally-oriented support plate 110 which directly supports the uprights 104,106,108. Three collars 112,114,116 are bolted to the support plate 110, and receive the lower cylindrical members of the uprights 104,106,108 respectively. Three lock mechanisms, basically of the type described above, consisting of a threaded passage in each collar and an Allen key screw threaded into the passage, serve to releasably lock the uprights into the respective collars. The support plate 110 is in turn attached to the base 68 by means of three selectively extensible connectors 118, 120, 122, that is, connectors which can be selectively extended or contracted in effective length between the support plate and base. The connectors 118, 120, 122 include threaded shafts 124, 126, 128, respectively, which extend upwardly through three clearance holes (only one clearance hole 130 illustrated) in the support plate 110 that access the interior of both the hollow collars and the uprights 104,106,108. The connectors 118, 120, 122 include ball-joints (only ball-joint 132 apparent in the view of FIG. 9) which attach the connectors to the base 68. The threaded shafts of the connectors are attached to the ball-joints by means of three nuts 134, 136, 138 which are welded to the individual ball-joints and into which the connector shafts are threaded. Three other nuts 140, 142, 144, threaded one on each of the connector shafts, bear upwardly against the horizontal support member. The three extensible connectors 118, 120, 122 basically permit the support plate 110 to be tilted, by extension and contraction of the connectors, to adjust the horizontal orientation of the support plate 110 and consequently the vertical orientation of the support structure 70. The extensible connectors also permit fine adjustment of the elevation of the support structure 70, although in many instances it is not expected that such adjustment will be required. It will be readily appreciated that the clearance holes must be of sufficient diameter that the threaded connector shafts will not bind with the clearance holes as the support plate is tilted and that the shafts should be kept reasonably short to prevent contact with the internal surfaces of the uprights. It will also be appreciated that the arrangement can effectively be inverted with the ball-joints attached to the support plate 110 and the nuts 140, 142, 144 bearing against the base 68 which would then be provided with appropriate clearance holes.

The three extensible connectors 118, 120, 122 are in a triangular orientation with each connector at a different vertex of a hypothetical triangle. This arrangement is ideal for alignment or elevation adjustment of the support structure 70, as any one of the three connectors 118, 120, 122 can be extended or contracted by adjustment of the associated nut which bears upwardly against the support plate 110, to tilt the support structure 70, and the remaining two connectors are free to pivot on their respective ball-joints to accommodate the adjustment being made. An ability to adjust the vertical orientation of the towers is particularly significant if the base 68 is rested on a generally horizontal but uneven surface, such as a dirt surface that might be found at an outdoor fair or trade show, but may also be important if the theatre 10 is erected indoors on uneven flooring. To facilitate alignment, bubble-type level indicators are mounted on the projector housing 80 to indicate levelling along two mutually perpendicular axes, one level indicator on a back surface of the housing 80, the other on a side surface perpendicular to the back surface.

Another point to note regarding the base is that the legs 88, 90, 92 are arranged in an equilateral triangle arrangement, that the support plate 110 has a periphery of equilateral triangle shape, smaller than, but vertex-aligned with that of the legs, and that the collars are similarly oriented. This arrangement ensures that the tower 30 will be properly assembled even by inexperienced operators. Basically, it is not critical which side of the base 68 is oriented towards a particular corner defined by the viewing screens, as the sides of the base 68 are substantially identical and the positions of the collars of the support plate can be interchanged.

The screen support mechanism 46 of the tower 30 will be described with reference to FIGS. 5 and 6. The screen support mechanism 46 includes an upper screen support member 146 which releasably retains upper portions of the screens 12,14, and a lower screen support member 148 which releasably retains lower portions of the screens 12, 14, at the vertical corner 50. The upper screen support member 146 has two collars 156, 158 which are fitted about cylindrical uprights 270, 272 of the housing 80, which in turn receive in relative telescopic or sliding relationship the uprights 106,108 of the support structure 70, thereby mounting the upper screen support member 146 for vertical sliding movement on the support structure 70. The lower screen support member 148 has two similar collars 160,162 which similarly mount the lower screen support member to the uprights 270,272 and consequently to the support structure uprights 106, 108 for relative vertical sliding movement on the support structure 70. Each of the collars has a lock mechanism basically of the type described above for releasably locking the collar to the respective upright. It should be noted that both the upper and lower screen support members 146, 148 are mounted for relative vertical sliding movement on the support structure 70, and for vertical displacement relative to one another, thereby permitting (in co-operation with adjacent towers) selection of the vertical elevation of the screens 12, 14 and also receipt of taller screens, if the theatre is to be expanded in height. A corner member (described more fully below) of preselected length, retained between the upper and lower screen support members, 146, 148 serves during assembly to fix the separation of the support members 146, 148 at a distance or value corresponding to the height of the viewing screens.

Channeled members are used in the support members 146, 148 to releasably receive upper and lower portions of the viewing screen 12, 14. The upper screen support member 146 includes a channel member 164 with two arms 166, 168 angled at about 40 degrees (the common corner angle). The channel member 164 has an upwardly opening channel 170 intended to receive upper portions of the screens 12, 14. The lower screen support member 148 similarly has a channel member 172 with two arms 174, 176 angled at about 40 degrees, and has a downwardly opening channel 178 intended to receive lower portions of the screens 12, 14. The angled channel members of the upper and lower screen support members, since they receive portions of adjacent screens defining a corner, serve to constrain the screen members to enclose the common corner angle, whenever received by the angled channel members, during assembly of the threatre. Only the construction and support of the screen 12 will be described in detail. The other screens are substantially identical and similarly retained.

The screen 12 which is typical includes a rigid, square, tubular upper screen member 150 of aluminum and an identical lower screen member 152, which are generally horizontally oriented. A flexible sheet 154 primarily of an appropriate screen material, such as a vinyl, is attached to and extends between the upper and lower screen members 150, 152. A lower section of the sheet 154 includes a horizontal strip 155, about 4 inches tall, of elastomeric material, such as rubber, adhesively secured to the vinyl, and attached about the lower screen member 152. The elastomeric strip (which is black) not only defines a visible lower border of the screen 12 but also facilitates installation of the screen 12.

The screen 12 is installed between towers 30, 46 by first inserting portions of the upper screen member 184 into the upwardly opening channels of the upper screen support members of the towers 30,46, which are dimensioned to closely receive the screen member 189. It is assumed that these upper screen support members of each tower have first been locked to the associated support structure at a preselected elevation. The flexible sheet 154 is allowed to drop downwardly over the lower screen support members of the towers 30, 46. End portions of the lower screen member 186 are then inserted into the downwardly opening channels of the lower screen support members, (which have been locked to the associated support structure a preselected distance below the upper screen support members) where the lower screen member end portions are closely received. The elastomeric strip 155 permits the screen 12 be stretched in this process to facilitate receipt of the lower screen member 186.

Figure 10:
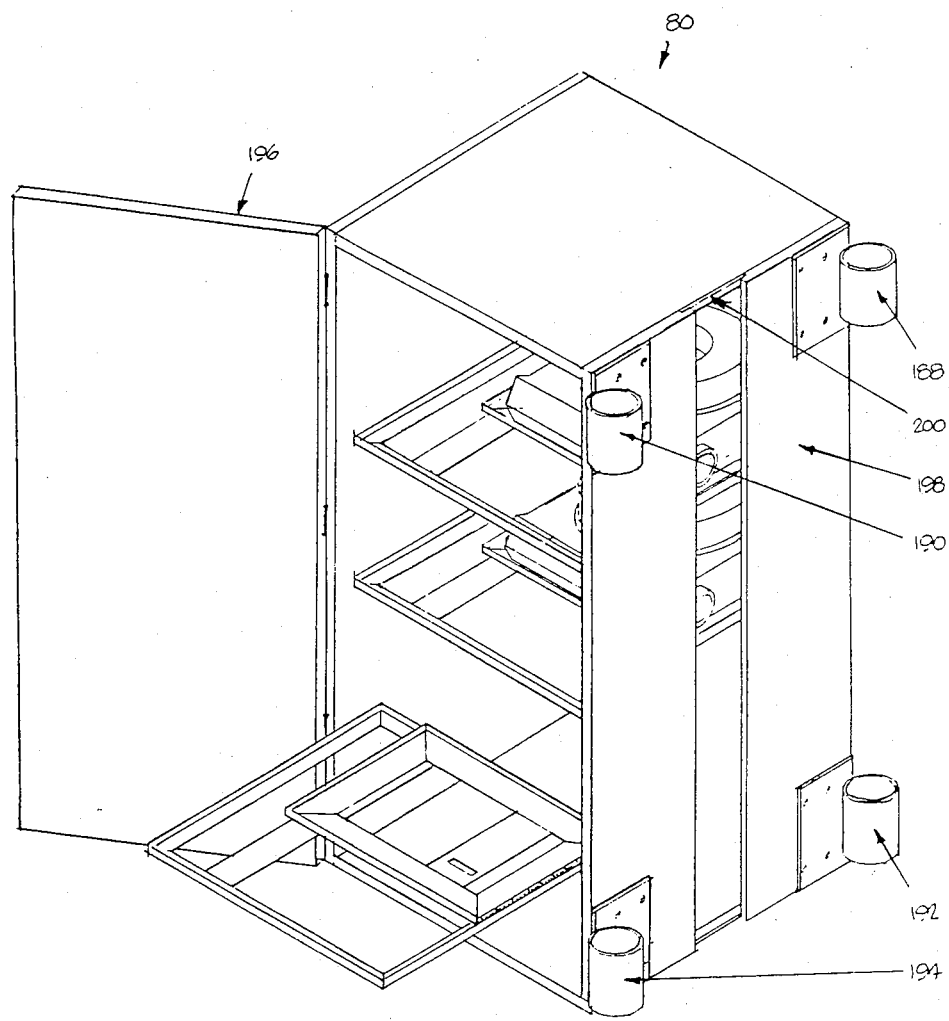
FIG. 10 is a perspective view of a projector housing supported by the tower.

The projector housing 80 is illustrated in greater detail in the view of FIG. 5, 6 and 10. Upper steel collars 188, 190 are bolted to the projector housing 80 and fitted about the cylindrical uprights 270, 272. Lower collars 192, 194 are similarly attached to the projector housing 80 and fitted to the uprights 270, 272. Lock mechanisms basically of the type described, consisting of apertures in the collars and associated Allen key screws, serve to releasably fasten the collars to the uprights 270, 272. Similar lock mechanisms, serve to releasably lock the housing uprights 270, 272 to the support uprights 106, 108. The projector housing 80 is consequently mounted to the support structure 70 for relative vertical sliding movement, and can be moved to any desired vertical position on the support structure 70.

A face 198 of the projector housing 80, proximate to the corner 50, has a vertical aperture in which is installed a transparent strip 200 of plastic material that permit projection of light from the projector housing 80. Three slide projectors are shown positioned on shelves at different heights in the housing 80, three projectors being preferred to permit greater image control, particularly during the fading in and out of images. The shelves are themselves track mounted to the housing 80 to permit the shelves together with their associated projectors to be conveniently slid through a hinged door 196 for change of slide materials and installation, adjustment or removal of the projectors. Each shelf also includes a mechanism for adjusting the horizontal position of the image projected by the associated projector. The projector housing preferably has a plywood construction in which an appropriate aluminum veneer is applied; and a largely closed housing is preferred to an open support structure in order to protect the projectors from infiltration of dirt or dust and accidental damage. These matters will be readily apparent to one skilled in the art.

Figure 11:
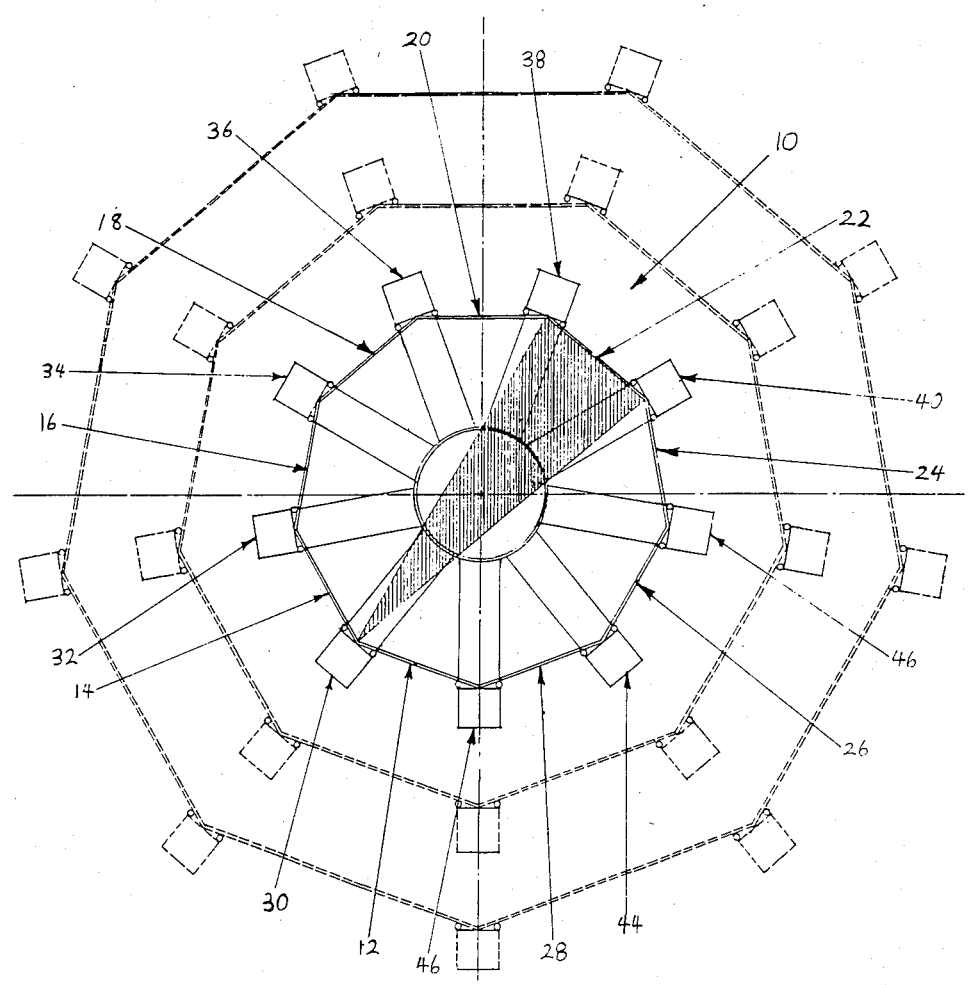
FIG. 11 is a plan view symbolically illustrating the polygonal arrangement of viewing screens in the theatre of FIG. 1 and the projection path from the tower of FIGS. 5 and 6, together with the expanded versions of the theatre (in stippled outline) which have been illustrated in side elevation in FIGS. 3 and 4.

The projection technique embodied by the theatre 10 is best understood with reference to FIG. 11 which is a symbolic plan view inter alia of the theatre 10. Each of the towers 30–46 will be seen to be oppositely disposed across the internal viewing region 48 to one of the viewing screens 12–28. For example, the tower 30 is oppositely disposed to the viewing screen 22, and the projectors which are normally mounted in the projector housing 80 of the tower 30 would be oriented to project light across the internal viewing region 48 onto the screen 22. The projection field from the tower 30 to the viewing screen 22 has been shown in FIG. 11 with cross-hatching.

Figure 8:
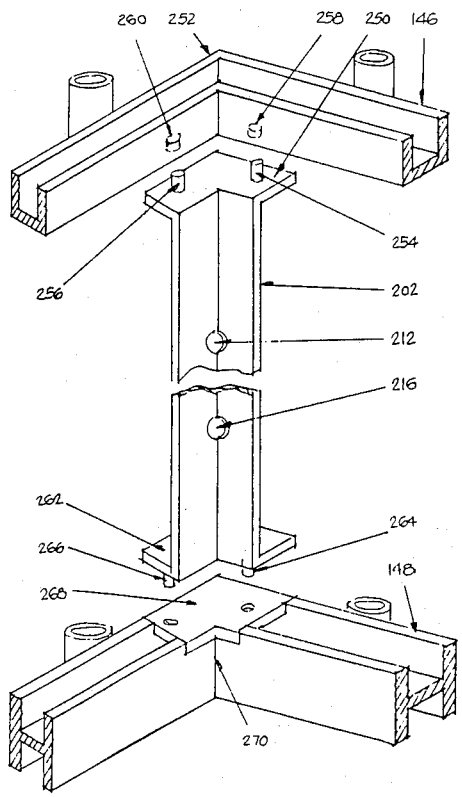
FIG. 8 is an extensively fragment perspective view of a corner member associated with the tower which spaces upper and lower screen retaining members by a predetermined amount and which has projection apertures.

Three passages (corresponding in number to the projectors at each tower) are provided at each corner of the polygonal arrangement of viewing screen for projection of light onto oppositely-disposed screens. In connection with the corner 50, the structure which permits projection of light emanating from the strip 200 to the opposing screen 22 is shown in FIG. 5, 6 and 8. The structure includes a vertically-oriented corner member 202 which is releasably secured between the upper and lower screen support members 146, 148. The corner member 202 has two planar sections 204, 206, angled at about 40degrees (the common corner angle), which are overlaid respectively by side edge portions 208, 210 of the adjacent screens 12, 14. The screen side edge portions may be taped to the corner member 202, if desired, to provide a more light-tight relationship. Three vertically aligned apertures 212, 214, 216 are formed at the junction of the planar sections 204, 206 to permit passage of light from the transparent strip 200 of the projector housing 80 into the internal viewing region 48. The projector housing 80 can be positioned vertically on the support structure to position the projectors before the apertures 212, 214, 216, and the adjustment mechanisms associated with the projectors can then be used to properly oriented the projected images on an opposing screen.

The corner member 202 also serves the function of spacing the upper and lower screen support members 146, 148 by a predetermined distance during assembly of the theatre 10. The corner member 202 is formed with an upper angled flange 250 dimensioned to overlay bottom surfaces of the corner 252 of the upper screen support member 146. A pair of upwardly directed shafts 254, 256 welded to the upper flange 250 are received by a pair of apertures 258, 260 appropriately positioned in the bottom of the upper screen support member 146 to receive the shafts 254, 256. A lower end of the corner member 202 is similarly formed with a lower angled flange 262 having a pair of downwardly directed shafts 264, 266. The shafts 264, 266 are received in apertures 264, 266 of an angled or cornered plate 268 welded to the lower screen support member 148 to the upper surface of its corner 270. The corner member 202 is retained between the upper and lower screen members, with its shafts extending into the described apertures, by sliding the lower screen support member 148 towards the upper screen support member 146 (previously fixed to the support structure 70), appropriately interposing the corner member 202, and then fixing the lower screen support member 148 to the support structure 70. The length of the corner member 202 will be selected to space the upper and lower screen support members for receipt of a screen of predetermined height.

The structure described above, namely, the viewing screens 12–28 and towers 30–46, connected as described, defines a collapsible panoramic theatre. However, in the this particular embodiment of the invention, a releasable tower connecting system is provided which serves not only as the primary means for rigidly connecting the towers to define a unitary tower structure, but also ensures that the towers can be repeatedly erected in the predetermined orientation shown in FIG. 1.

The tower connecting system includes a multiplicity of straight, rigid connectors of uniform size (principally length) and connector receipt means mounted on each tower which co-operate with the connectors to constrain the towers to space themselves in a predetermined manner as the theatre 10 is erected. The connection system will be described with reference to the tower 30, and is best illustrated in the views of FIGS. 1, 5, 6 and 7. The other towers have similar connector receipt means, and are joined by the connectors in a similar manner.

Figure 7:
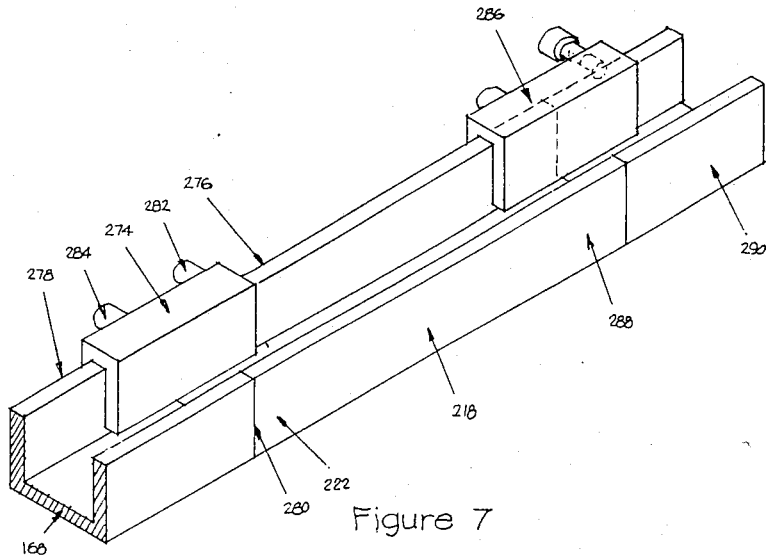
FIG. 7 is an extensively fragmented perspective view of an upper connector which serves to join the tower to an adjacent tower.

The tower 30 is connected to one adjacent tower 32 by an upper connector 218 and to the other adjacent tower 48 by the upper connector 220. Both of these connectors 218, 220 are generally horizontally oriented and both have U-shaped cross-sections with an upwardly opening channel. The upper screen retaining member 146 of the tower 30 (in this particular embodiment of the invention) serves a dual function of not only receiving and orienting the adjacent screens 12, 14, but also serve to receive and align the connectors 218, 220. The joint securing one end portion 222 of the connector 218 to the upper screen support member 148 is illustrated in FIG. 7. The connector end portion 222 is butted end-to-end with the retaining member arm 168 in general alignment with the generally straight arm 168. A channeled lock member 274 is dimensioned to closely receive aligned and abutted, vertically-oriented portions 276, 278 of the connector end portion 222 and retaining member arm 168, and spans the junction 280 between the two members. A pair of set screws 282, 284 threaded into apertures in the lock member 274 on either side of the junction 280, are tightened until the screws 282, 284 bear against both the connector end portion 222 and the retaining arm 168, thereby releasably locking the connector 222 to the tower 30. A similar locking member 286 releasably locks the other end portion 288 to the straight arm 290 of the upper screen support member of the tower 32. The connector 220 is similarly connected between the tower 30, 46. It will be apparent from this arrangement that the upper screen retaining members of the three towers 30, 32, 46 together with the channeled lock members serve to constrain the connectors 218, 220 to contain the common corner angle whenever secured to the towers, as described. Because of the uniform predetermined length of the connectors, the towers 30, 32, 46 will be constrained to position themselves in a predetermined arrangement, the angle formed by the towers being constrained to correspond to the common corner angle and the spacing between the towers being fixed by the length of the connectors. As will now be apparent, such a relationship will be established for each tower and the corresponding pair of adjacent towers, as these towers are joined with the connectors, and consequently the framework of the theatre 10 is erected in a predetermined, predictable manner. Moreover, since the connector receipt means of each tower (the straight arms of the upper screen retaining members) are part of or more generally fixed to the channeled members and generally aligned with the arms of the channel members, once the tower framework of the theatre 10 is erected, the screen retaining means will necessarily be positioned, or positionable by vertical sliding movement, to properly receive and constrain the viewing screens to form the recited polygonal arrangement with the preselected common corner angle.

The lower screen retaining member of the tower 30 is adapted to receive rigid straight lower connectors 228, 230 extended from the pair of adjacent towers 32, 46 (and all other towers are similarly adapted). the connection of the lower connectors 228, 230 between the three towers is substantially identical to that described above, and consequently will not be described. Essentially, the towers of the theatre 10 are joined by upper and lower networks of releasable connectors, either network being sufficient in itself to ensure that the towers orient in a predetermined manner.

A network of wire connectors 232 joins the various towers 30-46. The central focus of the network 232 is a metal ring 234 of about 2 foot diameter from which pairs of wires are extend to the uprights of each tower. These ends of the wires are hooked to steel eyes attached to the collars of the upper screen retaining member of the various towers (such as the collars. Each wire so extend has a turnbuckle which permits adjustment of the length of and tension in the wire. The wire network 232 serves in part to reinforce the tower structure, but serves also to support a horizontal blackout curtain (not illustrated) which is laid over the top of the theatre 10 to reduce influx of light into the viewing region 48.

As will be apparent in FIG. 5, the connector 228 has an H-shaped cross-section conforming to that of the arms of the lower screen retaining member of the tower 30. Although not essential for the purposes of the invention, it should be noted that the lower groove in the connector 228 co-operates in receipt and retention of lower portions of the screen 12, and that the upper groove (which is continued by other connectors and lower screen retaining means about the full circumference of the theatre) provides a very useful channel for running electric wiring between the various projector housings, for powering and control of the projectors. The upper connector member 218 (for example) has a U-shaped cross-section conforming to that of the arms of the upper screen retaining member so that it too co-operates in the receipt and retention of upper portions of the screen 12.

Figure 4:
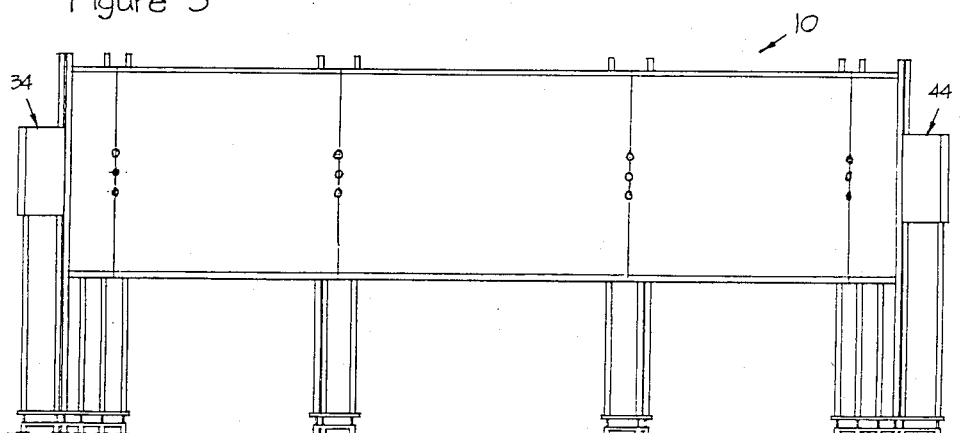

The theatre 10 as described above is suitable for use only in a darkened environment. An upper blackout screen can be laid over the top of the theatre 10, particularly over the wire network 232 as mentioned above. A side blackout curtain 246 in a multiplicity of sections can be suspended from the lower connectors associated with each tower, as shown in FIGS. 4 and 5, preferably by adhering complementary hook-and-eye connectors commonly identified by the trade mark Velcro to the lower connectors and the sections of the side blackout curtain 21.

Erection of the theatre 10 proceeds essentially as follows. First, a central point is selected on the generally horizontal surface where the theatre 10 is to be erected, corresponding to where the center of the theatre is to be located. A chain of preselected length is then extended from the central point to a perimeter point where the first tower is to be erected, which perimeter point is preferably the highest point of elevation at the perimeter to ensure that a minimum clearance height for the screens can be immediately achieved as the towers are erected (considerable adjustment otherwise being required), particularly in outdoor applications where a very uneven grade occurs. It will be assumed for purposes of describing the erection of the theatre 10 that the first tower is the tower 30 described in detail above.

The horizontal support plate 110 is then positioned on the extensible connectors 118, 120, 122 above the base 68. With a forklift, the projector housing 80 is lifted to a position sufficiently high above the horizontal support plate 110 that the projector housing uprights 270, 272 may be slipped into the upper and lower housing collars, and locked into place. The upper screen support member 146 is then installed on the housing uprights 188, 190 by means of its collars 156, 158, and locked into place flush with the tops of the housing uprights 270, 272. The lower screen support member 148 is then mounted by means of its collars 160, 162 onto the housing uprights 270, 272, and temporarily fastened to the housing uprights at a position immediately below the housing 80 (to permit access to the lock mechanisms which secure the housing uprights 270, 272 to the support structure uprights 106, 108). The telescoping support structure uprights 106, 108 are then inserted into the housing uprights 270, 272 (from above), and locked into the support plate collars 114, 116. The projector housing 180 is then raised with the forklift to its final location height, which is determined by means of the transit. This can be done by siting the bottom of the projector housing 80, and if necessary, a chain of predetermined length may be attached to and extended downwardly from the bottom of the housing 80 to permit such siting. (It is desirable that the bottom of the lower screen support member 148, and consequently the bottoms of the associated screens 12,14, be above average head height, at about seven feet. The support structure uprights 106, 108 are then telescopically extended to ensure that sufficient lengths are within the housing uprights 270, 272, and locked against telescopic movement. The housing uprights 270, 272 are then locked to the support structure uprights by means of countersunk set screws threaded in apertures in the housing uprights 270, 272. The lower screen support member 148 may then be loosened, and the corner member 202 positioned between the upper and lower screen members 146, 148, and the lower screen support member 148 then re-locked onto the housing uprights 270, 272 in its final position. The alignment mechanism 76 can then be manually-adjusted (while observing the level indicators on the housing 80) to ensure that the support structure uprights 106, 108 are substantially vertical (as viewed in a vertical plane intersecting the two uprights). The remaining support structure upright 104 can then be locked into the support plate collar 112, and telescopically extended to engage the bottom of the housing 80. The support structure 70 can then be further levelled by observing the other level indicator on the housing 80, and releasing and re-locking the telescoping member 104 at an appropriate height.

The transit may then be rotated through 40 degrees, the positioning chain extended and the base of the tower 32 roughly located. The tower 32 can then be assembled in substantially the manner as the tower 30. Proper relative location of the two towers 30, 32 is ensured by connecting the upper connector 218 between the towers, and the lower connector 228 is then preferably also fastened between the towers 30, 32. The lower connector 228 can be provided with a bubble-type level indicator to indicate horizontal orientation. Relying on this level indicator, the adjustment mechanisms of the tower 30, 32 can be adjusted to ensure proper levelling of the screen 12. This procedure can be repeated until all towers have been erected, and joined by the upper and lower connectors. Once this unitary tower structure has been defined, the various screens may be effectively snapped into place between the upper and lower screen retaining members of the various towers. The wire network 232 can then be installed, and the various turn buckles tightened to ensure that the wire network is substantially horizontal. Wiring may then be run through the lower channel members to the various projector housings, the upper blackout curtain laid, and the side blackout curtain installed in sections on the lower connectors adjoining the towers. It will be readily apparent, that the exact order of assembly described above is not absolutely essential, and also that disassembly of the theatre 10 involves disconnection of the various components, essentially in an order reverse to that described.

It will be appreciated that a particular embodiment of the invention has been described and that modifications may be made therein without departing from the spirit of the invention or the scope of the appended claims.

We claim:

1. A collapsible panoramic theatre for use with a multiplicity of projectors, comprising:
   a multiplicity of generally vertical viewing screens arranged in a polygonal arrangement which defines an internal viewing region, each pair of adjacent viewing screens in the polygonal arrangement defining a vertical corner, each vertical corner being oppositely disposed across the internal viewing region to one of the viewing screens;
   a multiplity of towers external to the polygonal arrangement of viewing screens, one of the towers being located at and associated with each of the corners of the polygonal arrangement;
   each of the towers including
   (a) a free-standing base,
   (b) a support structure extending upwardly from the base,
   (c) screen support means, mounted on the support structure, for releasably supporting the pair of adjacent viewing screens at the vertical corner associated with the tower, and
   (d) projector support means, mounted on the support structure for, releasably supporting one of the projectors;
   means defining a projection passage at each vertical corner positioned to permit projection of light from the projector of the tower associated with the vertical corner across the internal viewing region onto the associated oppositely disposed one of the viewing screens.

2. A panoramic theatre as claimed in claim 1 in which the screen support means of each tower comprise:
   upper screen retaining means, mounted for vertical sliding movement on the support structure, for releasably retaining upper portions of the pair of adjacent viewing screens defining the vertical corner associated with the tower;
   upper lock means for releasably locking the upper screen retaining means to the support structure;
   lower screen retaining means, mounted for vertical sliding movement on the support structure, for releasably retaining lower portions of the pair of adjacent viewing screens defining the vertical corner associated with the tower; and,
   lower lock means for releasably locking the lower screen retaining means to the support structure.

3. A panoramic theatre as claimed in claim 2 in which at least one of the viewing screens comprises:
   a generally horizontal, rigid upper screen member having first and second horizontally-spaced apart end portions;
   a generally horizontal, rigid lower screen member having first and second horizontally-spaced apart end portions; and,
   a flexible sheet of screen material extending between the upper and lower screen members.

4. A panoramic theatre as claimed in claim 3 in which: the multiplicity of towers includes first and second towers supporting the at least one screen;
   the upper and lower screen retaining means of the first tower releasably retaining the first end portions of the upper and lower screen members respectively; and,
   the upper and lower screen retaining means of the second tower releasably retaining the second end portions of the upper and lower screen members respectively.

5. A panoramic theatre as claimed in claim 2 in which in each tower:
   the upper screen retaining means of the tower include upper angled bracket means shaped to receive the upper portions of the pair of adjacent viewing screens at the vertical corner associated with the tower;
   the lower screen retaining means of the tower include lower angled bracket means shaped to receive the lower portions of the pair of adjacent viewing screens at the vertical corner associated with the tower;
   each of the upper and lower bracket means are angled according to the common corner angle of the polygonal arrangement, whereby, the internal viewing region of the theatre may be expanded or decreased by replacing the viewing screens with larger or smaller viewing screens.

6. A panoramic theatre as claimed in claim 1 in which each tower comprises manually-operable alignment means attached to the base of the tower for adjusting the vertical orientation of the tower.

7. A panoramic theatre as claimed in claim 6 in which the alignment means of each tower comprise:
   a horizontal support member located above the base of the tower and supporting the support structure of the tower; and,
   selectively extensible connectors supporting the horizontal support member from the base of the tower, each extensible connector including a ball joint connection connecting the extensible connector to one of the base and support member of the tower.

8. A panoramic theatre as claimed in claim 6 in which for each tower:
   the support structure includes three generally vertical, cylindrical members;
   the alignment means of the tower include
   (a) a generally horizontal support member located above the base of the tower and having three apertures, (b) three hollow attachment members attached to the structure support member, each attachment member retaining a lower end portion of one of the three cylindrical members and positioned above one of the apertures in the structure support member, (c) three threaded shafts extending upwardly from the base, each threaded shaft extending through a different one of the three apertures of the support member into the interior of a different one of the three cylindrical members, (d) three ball joint connections, each ball joint connection connecting a different one of the three threaded shafts to the base, and (e) three nuts, each of the nuts mounted in threaded engagement on a different one of the three threaded shafts and bearing upwardly against the structure support member.

9. A panoramic theatre as claimed in claim 1 in which the projector support means are mounted for sliding vertical movement on the support structure and include lock means for releasably locking the projector support means at a selectable height to the support structure.

10. A panoramic theatre as claimed in claim 1 in which in each tower: the support structure includes a pair of generally vertical, spaced-apart cylindrical members;

the projector support means of the tower include connector means which mount the projector support means to the pair of cylindrical members for vertical movement relative to the pair of cylindrical member; and, the projector support means of the tower include lock means for releasably locking the projector support means at a selectable height to the pair of cylindrical members.

11. A panoramic theatre as claimed in claim 1 in which the support structure of each tower comprises:

a generally vertical, telescoping member spaced-apart from the pair of cylindrical members, the telescoping member having a lower end portion coupled to the base of the tower and an upper end portion which bears against the projector support means of the tower; and, lock means for releasably locking the telescoping member against telescopic movement.

12. A tower for use in erecting a collapsible panoramic theatre which includes a pair of generally vertical viewing screens together defining a vertical corner, comprising:

a free-standing base for supporting the tower;

a support structure extending upwardly from the base; manually-operable alignment means attached to the base for adjusting the vertical orientation of the tower;

screen support means mounted on the support structure for releasably supporting the pair of viewing screens at the vertical corner; and, projector support means mounted on the support structure for supporting a projector.

13. A tower as claimed in claim 12 in which the screen support means comprise:

upper screen retaining means, mounted for vertical sliding movement on the support structure, for releasably retaining upper portions of the pair of viewing screens;

upper lock means for releasably locking the upper screen retaining means to the support structure;

lower screen retaining means, mounted for vertical sliding movement on the support structure, for releasably retaining lower portions of the pair of viewing screens; and, lower lock means for releasably locking the lower screen retaining means to the support structure.

14. A tower as claimed in claim 13 in which:

the upper screen retaining means include upper angled bracket means shaped to receive the upper portions of the pair of viewing screens;

the lower screen retaining means include lower angled bracket means shaped to receive the lower portions of the pair of adjacent viewing screens at the vertical corner associated with the tower;

each of the upper and lower bracket means are angled according to the same predetermined angle, whereby, the pair of viewing screens are constrained by the upper and lower bracket means to enclose the predetermined angle at the vertical corner.

15. A tower as claimed in claim 12 in which the alignment means comprise: a generally horizontal support member located above the base and supporting the support structure of the tower; and, selectively extensible connectors supporting the horizontal support member from the base, each extensible connector including a ball joint connection connecting the extensible connector to one of the base and support member.

16. A tower as claimed in claim 12 in which:

the support structure includes three generally vertical, cylindrical members;

the alignment means include (a) a generally horizontal support member located above the base of the tower and having three apertures, (b) three hollow attachment members attached to the support member, each attachment member retaining a lower end portion of different one of the three cylindrical members and positioned above one of the apertures in the structure support member, (c) three threaded shafts extending upwardly from the base, each threaded shaft extending through a different one of the three apertures of the support member into the interior of a different one of the three cylindrical members, (d) three ball joint connections, each ball joint connection connecting a different one of the three threaded shafts to the base, and (e) three nuts, each of the nuts mounted in threaded engagement on a different one of the three threaded shafts and bearing upwardly against the support member.

17. A tower as claimed in claim 12 in which the projector support means are mounted for sliding vertical movement on the support structure and include lock means for releasably locking the projector support means at a selectable height to the support structure.

18. A tower as claimed in claim 12 in which: the support structure includes a pair of generally vertical, spaced-apart cylindrical members;

the projector support means include connector means which mount the projector support means to the pair of cylindrical members for vertical movement relative to the pair of cylindrical member; and, the projector support means include lock means for releasably locking the projector support means at a selectable height to the pair of cylindrical members.

19. A tower as claimed in claim 18 in which the support structure comprises:
- a generally vertical, telescoping member spaced-apart from the pair of cylindrical members, the telescoping member having a lower end portion coupled to the base and an upper end portion which bears against the projector support means of the tower; and,
- lock means for releasably locking the telescoping member against telescopic movement.

20. A tower as claimed in claim 19 in which the base comprises:
- a multiplicity of horizontally-oriented, radially-directed telescoping members, each telescoping member including a downwardly-directed leg which can be telescopically displaced in a radial direction by telescopic movement of the telescoping member; and,
- lock means for releasably locking the telescoping members against telescopic movement.

21. A collapsible panoramic theatre comprising:
- a multiplicity of generally vertical viewing screens arranged in a polygonal arrangement which defines an internal viewing region, each pair of adjacent viewing screens in the polygonal arrangement defining a vertical corner angled according to a common preselected corner angle;
- a multiplicity of towers external to the polygonal arrangement of viewing screens, one of the towers being located at and associated with each of the vertical corners of the polygonal arrangement;
- releasable connection means consisting of a multiplicity of rigid connectors of preselected uniform size for rigidly connecting the towers to one another;
- each of the towers including
  - (a) a free-standing base,
  - (b) a support structure extending upwardly from the base,
  - (c) screen support means, mounted on the support structure, for releasably supporting the pair of adjacent viewing screens at the vertical corner associated with the tower, and
  - (d) connector receipt means, mounted on the support structure, for releasably receiving the connection means, the connector receipt means including constraining means co-operating with the connection means to constrain the tower, one adjacent tower and the other adjacent tower to locate in a predetermined relative orientation whenever the tower, the one adjacent tower and the other adjacent tower are connected together by the connection means and the connector receipt means of the respective towers.

22. A collapsible panoramic theatre as claimed in claim 21 in which for each tower:
- a first one of the connectors joins the tower to the adjacent tower and a second one of the connectors joins the tower to the other adjacent tower, each of the connectors being generally straight members;
- the support structure includes a pair of generally vertical spaced-apart cylindrical members;
- the screen support means include upper screen retaining means for releasably retaining upper portions of the pair of adjacent viewing screens defining the vertical corner associated with the tower, the upper screen retaining means including connection means for mounting the upper screen retaining means to each of the cylindrical members for vertical sliding movement relative to the support structure;
- the screen support means include lower screen retaining means for releasably retaining lower portions of the pair of adjacent viewing screens defining the vertical corner associated with the tower, the lower screen retaining means including connection means for mounting the lower screen retaining means to each of the cylindrical members for vertical sliding movement relative to the support structure;
- the upper and lower screen retaining means including means for constraining the pair of adjacent viewing screens defining the vertical corner associated with the tower to enclose the common corner angle whenever the viewing screens are retained by the upper and lower screen retaining means, and including lock means for releasably locking the upper and lower screen retaining members to the support structure; and,
- the constraining means include means fixed to one of the upper and lower screen retaining means for retaining the first and second connectors and for constraining the first and second connectors whenever received by the constraining means to enclose substantially the common corner angle.

23. A panoramic theatre as claimed in claim 21 in which the screen support means of each tower comprise:
- upper screen retaining means, mounted for vertical sliding movement on the support structure, for releasably retaining upper portions of the pair of adjacent viewing screens defining the vertical corner associated with the tower;
- upper lock means for releasably locking the upper screen retaining means to the support structure;
- lower screen retaining means, mounted for vertical sliding movement on the support structure, for releasably retaining lower portions of the pair of adjacent viewing screens defining the vertical corner associated with the tower; and,
- lower lock means for releasably locking the lower screen retaining means to the support structure.

24. A panoramic theatre as claimed in claim 23 in which at least one of the viewing screens comprises:
- a generally horizontal, rigid upper screen member having first and second horizontally-spaced apart end portions;
- a generally horizontal, rigid lower screen member having first and second horizontally-spaced apart end portions; and,
- a flexible sheet of screen material extending between the upper and lower screen members.

25. A panoramic theatre as claimed in claim 24 in which:
- the multiplicity of towers includes first and second towers supporting the at least one screen;
- the upper and lower screen retaining means of the first tower releasably retaining the first end portions of the upper and lower screen members respectively; and,
- the upper and lower screen retaining means of the second tower releasably retaining the second end portions of the upper and lower screen members respectively.

26. A panoramic theatre as claimed in claim 23 in which in each tower:
 the upper screen retaining means of the tower include upper angled bracket means shaped to receive the upper portions of the pair of adjacent viewing screens at the vertical corner associated with the tower;
 the lower screen retaining means of the tower include lower angled bracket means shaped to receive the lower portions of the pair of adjacent viewing screens at the vertical corner associated with the tower;
 each of the upper and lower bracket means are angled according to the common corner angle of the polygonal arrangement, whereby, the pair of adjacent viewing screens associated with the tower are constrained to form the common corner angle when received by the upper and lower screen retaining means of the tower.

27. A panoramic theatre as claimed in claim 21 in which each tower comprises manually-operable alignment means attached to the base of the tower for adjusting the vertical orientation of the tower.

28. A panoramic theatre as claimed in claim 27 in which the alignment means of each tower comprise:
 a horizontal support member located above the base of the tower and supporting the support structure of the tower; and,
 selectively extensible connectors supporting the horizontal support member from the base of the tower, each extensible connector including a ball-joint connection connecting the extensible connector to one of the base and support member of the tower.

29. A collapsible panoramic theatre comprising:
 a multiplicity of generally vertical viewing screens arranged in a polygonal arrangement which defines an internal viewing region;
 a multiplicity of towers external to the polygonal arrangement of viewing screens and releasably supporting the polygonal arrangement of viewing screens;
 releasable connection means consisting of a multiplicity of rigid connectors of preselected uniform size for rigidly connecting the towers to one another;
 each of the towers including
 (a) a free-standing base,
 (b) a support structure extending upwardly from the base,
 (c) screen support means, mounted on the support structure, for releasably supporting at least one of the viewing screens, and
 (d) connector receipt means, mounted on the support structure, for releasably receiving the connection means, the connector receipt means including constraining means co-operating with the connection means to constrain the tower, one adjacent tower and the other adjacent tower to locate in a predetermined relative orientation whenever the tower, the one adjacent tower and the other adjacent tower are connected together by the connection means and the connector receipt of the respective towers.

30. A collapsible panoramic theatre as claimed in claim 29 in which the connectors are generally straight members and in which for each tower:
 a first one of the connectors joins the tower to the adjacent tower and a second one of the connectors joins the tower to the other adjacent tower; and, the connector receipt means include first and second straight arm portions angled at a predetermined angle and generally horizontally oriented, and lock means for releasably locking the first connector to the first arm portion in rigid general alignment with the first arm portion and the second connector to the second arm portion in rigid general alignment with the second arm portion.

* * * * *